United States Patent [19]

Sander et al.

[11] 4,411,797
[45] Oct. 25, 1983

[54] DEWATERING OF SEWAGE SLUDGES ON CHAMBER FILTER PRESSES

[75] Inventors: Bruno Sander, Ludwigshafen; Klaus Hess, Bad Duerkheim; Peter Lintz, Heidelberg; Walter Goesele, Frankenthal, all of Fed. Rep. of Germany

[73] Assignee: BASF Aktiengesellschaft, Fed. Rep. of Germany

[21] Appl. No.: 308,129

[22] Filed: Oct. 2, 1981

Related U.S. Application Data

[63] Continuation of Ser. No. 149,964, May 15, 1980, abandoned.

[30] Foreign Application Priority Data

May 19, 1979 [DE] Fed. Rep. of Germany ....... 2920350

[51] Int. Cl.³ .......................... C02F 1/54; C02F 11/14
[52] U.S. Cl. .................................... 210/727; 210/738; 210/769; 210/784; 210/806
[58] Field of Search ............... 210/609, 702, 725, 727, 210/728, 732–734, 738, 768, 769, 784, 806

[56] References Cited

U.S. PATENT DOCUMENTS

| | | | |
|---|---|---|---|
| 3,279,603 | 10/1966 | Busse | 210/769 |
| 3,300,403 | 1/1967 | Kehoe | 210/609 |
| 3,342,731 | 9/1967 | Baumann | 210/711 |
| 3,531,404 | 9/1970 | Goodman et al. | 210/400 |
| 4,158,627 | 6/1979 | Ingemarsson | 210/771 |
| 4,159,684 | 7/1979 | Kirkup | 110/346 |
| 4,192,743 | 3/1980 | Bastgen et al. | 210/712 |

FOREIGN PATENT DOCUMENTS

| | | |
|---|---|---|
| 2700654 | 7/1977 | Fed. Rep. of Germany . |
| 2732018 | 7/1977 | Fed. Rep. of Germany . |
| 2603074 | 9/1977 | Fed. Rep. of Germany . |
| 1307621 | 2/1973 | United Kingdom . |
| 1380592 | 1/1975 | United Kingdom . |

OTHER PUBLICATIONS

Savage et al., "Sludge Dewatering With Filter Belt Presses" Presented at Tech. Conf. On New Advances in Sep. Tech., New York, 10/75, pp. 1–12.
Process Design Manual For Sludge Treatment And Disposal, U.S. EPA, Technology Transfer, Oct. 1974.
Parkhurst et al., "Dewatering Digested Primary Sludge," JWPCF, vol. 46, No. 3, Mar. 1974, pp. 468–487.
Jones et al., "The Economics Of Energy Usage & Recovery In Sludge Disposal" 49th Annual Conf. WPCF, Oct., 6, 1976 pp. 1–17.
Gas Wasserfach, Wasser/Abwasser, 118, 1977, p. 429.
Schlammbehandlungs-und-Beseitigung-Sanlagen, Technische, Mitteilungen, vol. 65, No. 9, 1972, p. 432.
Thomas, "The Use Of Filter Presses For The Dewatering Of Sludges," JWPCF, Jan. 1971, pp. 93–101.
Degremont Handbook, Bauverlag, GmbH, Wiesbaden, 1974, Berlin, DE, pp. 449–450.

Primary Examiner—Peter A. Hruskoci
Attorney, Agent, or Firm—Keil & Witherspoon

[57] ABSTRACT

A process for dewatering sewage sludges, the dewatering characteristics of which have been improved by adding an organic flocculant, on a chamber filter press, wherein the greater part of the water in the flocculated sludges is removed by gravity filtration in a process step upstream of the chamber filter press, without application of a pressure difference, and the actual pressure filtration, on the chamber filter press, is only then carried out.

In principle, commercial products can be used as the organic flocculant. These are water-soluble, macromolecular compounds which have been obtained by polymerization or copolymerization of acrylamide, acrylic cid and/or their salts, or of esters of acrylic acid or methacrylic acid with specifically modified alcohol components.

6 Claims, 1 Drawing Figure

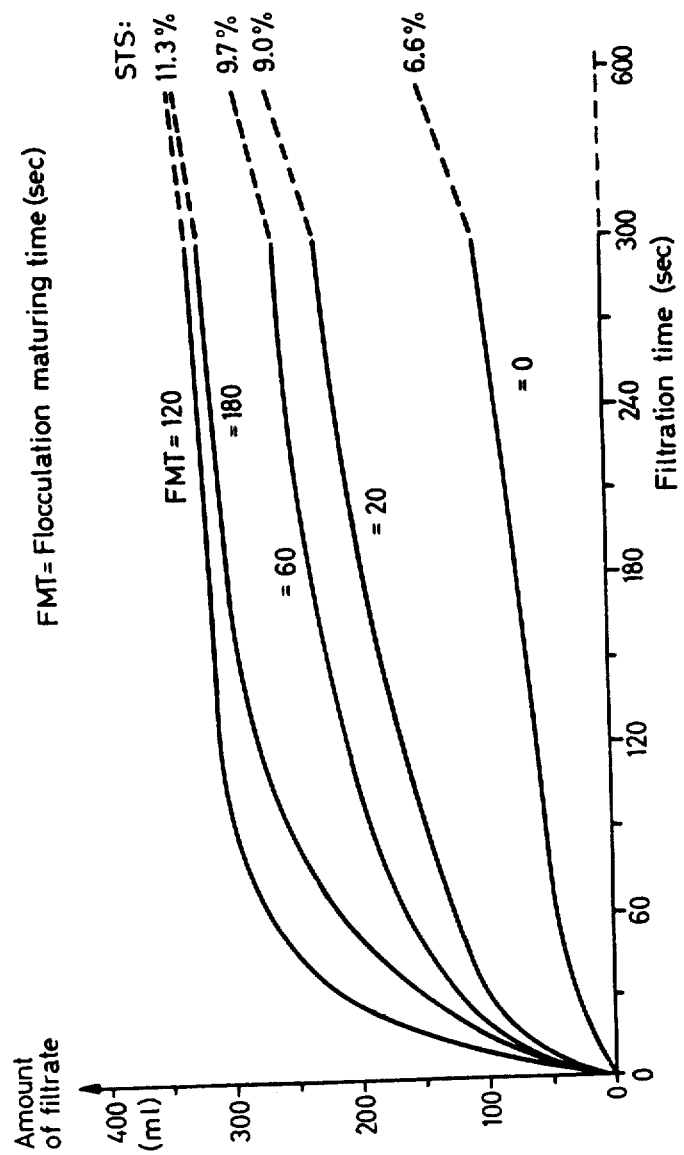

DEWATERING OF SEWAGE SLUDGES ON CHAMBER FILTER PRESSES

This is a continuation of application Ser. No. 149,964, filed May 15, 1980, now abandoned.

The present invention relates to a process for dewatering sewage sludges, whose dewatering characteristics have been improved by adding an organic flocculant, on a chamber filter press.

The solids in sewage sludges are concentrated either on continuous dewatering machinery, for example centrifuges and screen belt presses, or on batchwise-operated chamber filter presses.

When dewatering is carried out on centrifuges and screen belt presses, the sewage sludges are as a rule treated, either immediately before or during dewatering, with an organic flocculant in order to improve the dewatering characteristics. The sludge solids contents achieved depend on the type of sludge and are from 15 to 25% by weight after dewatering on centrifuges and from 20 to 40% by weight after dewatering on screen belt presses. In all these cases, the residual water contents are still rather high.

According to another process, the sewage sludges are dewatered in a single step on a chamber filter press, using sludge layers of from 25 to 35 mm, and applying high pressures, for example 15 bar. The dewatering assistants added are iron salts, lime and ash or other inert materials which form a supporting lattice, such as sand, rock powder, bentonite, finely divided coal and the like. The amounts of these additives are from 100 to 150% by weight, based on sludge solids. Though in this dewatering process the solids contents of the press cake are 40–60% by weight and are accordingly higher than in the processes referred to earlier, the actual sludge solids contents are in general only 20–30% by weight, because of the need to add substantial amounts of the additives. Accordingly, this process also does not achieve more extensive reduction in the sludge volume or in the specific water content.

It is also known that sewage sludges which have been treated exclusively with organic flocculants cannot be dewatered on chamber filter presses since the sludge flakes are destroyed on pumping, conveying and pressing and accordingly the press cake is difficult to detach from the filter cloths. These disadvantages manifest themselves particularly where normal sewage sludges are concerned, in which the organic proportion of the sludge solids is greater than 50% by weight. Such sludges are produced by biological degradation of organic constituents in the aeration tanks of treatment plants.

It is an object of the present invention to provide a dewatering process by which substantially greater concentration of the sludge solids can be achieved than is possible in the prior art. It is a further object of the invention to dewater sewage sludges, whose dewatering characteristics have been improved by adding an organic flocculant, under the extreme dewatering conditions which prevail on a chamber filter press, in such a way so that the conventional inorganic lattice-forming additives, such as lime, ash, sand, rock powder and/or bentonite, are not needed.

We have found that these objects are achieved, according to the invention, by a process wherein the greater part of the water in the flocculated sludges is removed by gravity filtration in a process step upstream of the chamber filter press, without application of a pressure difference, and the actual pressure filtration, on the chamber filter press, is only then carried out.

According to a further embodiment of the invention, after addition of the flocculant solution the sewage sludges are treated, to improve their dewatering characteristics, for from 0.5 to 5 minutes, especially from 1 to 3 minutes, in a tank, with or without stirring at speeds of from 5 to 50 rpm, after which they are subjected to the first dewatering step.

The preferred dewatering apparatus for the first dewatering step is a continuously operating screening drum, fitted with internal fitments which renew the surface of the sludge.

The thickness of the layers of sludge in the filter chambers is, according to the invention, from 15 to 30 mm, and is, where necessary, selected to suit the particular sewage sludge, so as to achieve particularly high sludge solids contents.

The sewage sludges may or may not be homogeneously mixed with coal sludges and/or sewage sludge ash before being subjected to flocculation and the two-stage dewatering treatment.

Surprisingly, the sludge solids contents in the filter cake, achieved by the dewatering process according to the invention, are very high. They are from 30 to 55% by weight, depending on the type of sludge, so that the specific water content (ie. kg of residual water per kg of sludge solids) is particularly low.

It is also surprising that by means of the sludge pretreatment according to the invention the sewage sludges can, in the first dewatering stage, be concentrated by gravity filtration to a sludge solids content of from 10 to 20% by weight, and that these concentrated sludges then remain stable, without destruction of the flake structure, under the press conditions which prevail on a chamber filter press, as manifested by the fact that the filter cakes detach satisfactorily, and without assistance, from the filter cloths.

Using the process according to the invention, it has become possible to dewater sewage sludges on chamber filter presses without having to add inorganic lattice-forming materials, for example lime, ash or sand.

Where the sludge is to be disposed off by burning, small amounts of a coat sludge and/or of the sewage sludge ash produced may or may not be added to the sewage sludges. It has proved advantageous to disperse these additives homogeneously, by means of a mixer, in the sewage sludge prior to flocculation and prior to carrying out the process according to the invention.

A further advantage of the process according to the invention has proved to be that the sewage sludge ash which is obtained by burning the filter cake and which, because of the sole use of organic flocculants, is lime-free, is a more effective dewatering assistant than the sewage sludge ash which is produced by burning filter cakes which have been conditioned with inorganic dewatering assistants such as lime and iron salts (see Comparative Example 3).

For the purposes of the invention, sewage sludges are primary sludges which are obtained by sedimentation or flocculation, in the preliminary clarification stage of a treatment plant, biological sludges (excess sludges) originating from a biological treatment plant, and mixed sludges resulting from mixing the above sludges, digested sludges and aerobically stabilized sludges which are produced, for example, by prolonged aeration at ambient temperature. The sludges may be of communal, industrial or mixed origin.

The solids contents of the sewage sludges can vary within wide limits, namely from 0.5 to 15% by weight. In general, however, sludges which have been concentrated by gravity sedimentation in thickeners are employed. The sludge solids contents are in that case from 3 to 6% by weight for biological sludges and from 5 to 12% by weight for primary sludges.

In principle, the commercial organic flocculants can be employed. These are water-soluble macromolecular compounds which are obtained by polymerization or copolymerization of acrylamide, of acrylic acid and/or its salts or of esters of acrylic acid or methacrylic acid in which the alcohol component has been specifically modified. These flocculants additionally differ in respect of their electrical charge (they may be cationic, anionic or electrically neutral) and in respect of their degree of polymerization.

The type and amount of a suitable flocculant is selected by conventional methods, in most cases on a laboratory scale. The requisite amounts of flocculant are from 100 to 400 g/m$^3$ of sewage sludge and depend on the nature of the particular sludge and on its solids concentration.

The flocculants are employed in the form of aqueous solutions of from 0.05 to 0.5 percent strength. These dilute flocculant solutions are prepared from the solid or liquid commercial products by conventional methods, in commercial equipment.

The flocculant solution is fed directly into the sludge line, downstream of the sludge pump. Aids for introducing the solution, for example a cone mixer may advantageously be used. The residence time in the sludge line, in which the sewage sludge and the flocculant solution are mixed, is in general only a few seconds. In the prior art, the flocculated sewage sludges are dewatered immediately after addition of the flocculant. We have found, however, that whilst the flocculation of the sewage sludges takes place spontaneously, a flocculation maturing time must be allowed to achieve optimum dewatering characteristics. This flocculation maturing time depends on the nature of the sludge, on its solids concentration and on the nature of the flocculant and is in general from 0.5 to 3 minutes and especially from 1 to 2 minutes.

To carry out the treatment industrially, a vertical vessel (inlet at the bottom, outlet at the top), equipped with a stirrer, is used. The stirrer employed is a spiral stirrer, the spiral being attached to the shaft, or a paddle stirrer. The subsequent mixing of the flocculated sludge in this vessel is carried out with the stirrer running at from 5 to 50 rpm, the stirrer speed being dependent on the mechanical stability of the particular sludge. It is also possible to use a horizontal mixing drum which possesses appropriate internal fitments (weirs) for circulating the flocculated sludge and providing an appropriate residence time. This drum is used especially for relatively heavy sewage sludges, in which the inorganic constituents predominate. After this sludge pre-treatment, the sewage sludge is fed, through wide nozzles and without pumping, directly to the first dewatering equipment.

In the flocculation treatment described, it is particularly important that there should be no overdosing with the flocculant solution. In the event of such overdosing, there is the danger that during the subsequent filtrations the filter fabrics will become clogged with slime. This can be checked by using the laboratory method described in German Patent Application No. P 28 37 017.4.

In the first dewatering stage, the flocculated sewage sludges are subjected to gravity filtration. A continuously running cylindrical screening drum has proved to be a particularly suitable apparatus. Inside the screen drums there is a cylindrical cage, with the filter fabric fixed to its peripheral surface. The filter fabric can consist of metal wire or of synthetic fibers, eg. polypropylene fibers or polyester fibers. Internally, the screening drums additionally possess fitments which renew the surface of the sludge, so that the sludge is turned intensively as it passes through the drum. These fitments are baffles, weirs or hollow spirals. The residence time of the sewage sludge, undergoing dewatering, in the screening drum is determined by the length of the apparatus, the throughput and the degree to which it is filled. The latter can be varied by varying the height of the weirs and by using different pitches of the hollow spirals (hollow screws). The screening drums run at speeds of from 1 to 20 rpm. The residence time in this dewatering stage is from 1 to 15 minutes and especially from 2 to 5 minutes.

This gravity filtration gives solids contents of from 10 to 20% by weight, and removes as much as from 50 to 80% of the water.

The flocculated and pre-dewatered sewage sludges are collected in an intermediate tank. From this tank, the chamber filter presses are fed by means of reciprocating diaphragm pumps or excentric screw pumps and the pressure filtration is carried out under final pressures of up to 15 bar. In principle, commercial chamber filter presses can be used, but in these the spacing of the filter plates is reduced from 30 to 20 mm and in special cases even to 15 mm, so as to make it possible to dewater thinner layers. This modification is particularly necessary, if high sludge solids contents are to be achieved, in the case of biological sludges, which are more difficult to dewater. The optimum thickness of sludge layer can be determined by introducing pairs of support fabrics into the filter chambers.

In the dewatering process according to the invention the filtration times are from 60 to 90 minutes and are therefore rather shorter than in single-stage dewatering on a chamber filter press, using inorganic dewatering assistants. Since, in the preliminary dewatering stage, the volume of the sewage sludges is reduced to 40-50% of the starting volume, the reduction in the thicknesses of the layers does not reduce the capacity of the equipment. On the contrary, in most cases the capacity of the chamber filter press is even increased.

In single-stage dewatering on chamber filter presses, using inorganic dewatering assistants, there are at times major fluctuations in the specific resistance of the filters. In the case of the nonconditioned sludges, values of from $100 \cdot 10^{12}$ to $300 \cdot 10^{12}$/g are found. This results in increased consumption of dewatering assistants and in excessively long filtration times. The fluctuations are attributable to variations in the nature of the sludge. We have found that in the dewatering process according to the invention, these fluctuations do not occur or only occur to a slight extent, since the dewatering properties of the sewage sludges have been fundamentally improved by flocculation.

The sludge solids contents achieved in the press cakes are from 45 to 55% by weight, and in special cases up to 60% by weight, for primary sludge, digested sludge and aerobically stabilized sludge, from 35 to 45% by weight for mixed sludges, from 25 to 30% by weight for biological sludges and from 30 to 40% by weight for mixtures of biological sludges and coal sludges.

As a result of the high degree of concentration of the sludge solids achieved by the process according to the invention, economical disposal of the sludge has become possible. Where the sludge is dumped, the reduction in its volume saves transport costs and reduces the dumping space required. A particular advantage is achieved if the press cake is to be burnt. For example, most sewage sludges which can be dewatered to solids contents of greater than 35% by weight can be burnt unaided. The addition of coal sludge or other fuel adjuvants, for example lumps of coal, or fuel oil, is therefore no longer necessary. A further advantage is that the use of lime can be dispensed with and hence the deposits and crusts which lime is known to cause on the incinerator no longer occur.

Accordingly, the process according to the invention results in energy savings, greater safety of operation and better capacity utilization of the dewatering equipment and the incinerator.

The Examples and Figure which follow illustrate the invention. All percentages are by weight:

DETERMINATION OF THE FLOCCULATION MATURING TIME 500 ml of a sludge sample to be examined are introduced into a tall 1 liter beaker. An 0.2 percent strength flocculant solution is then added over 10 seconds whilst stirring at 50 rpm with a square paddle stirrer (7 cm edge length of 6 square holes of 1 cm). If different amounts of flocculant are used, water is added to the flocculant solution to obtain a standard volume.

After this short 10 seconds stirring period, the sludge is charged directly onto a glass suction filter (diameter 120 mm) carrying a polypropylene cloth (diameter 110 mm), and the amount of filtrate is noted after the gravity filtration has proceeded for 30, 60, 90, 120, 180, 240, 300 and 600 seconds. This experiment is treated as the blank experiment, without flocculation maturing time.

To determine the optimum flocculation maturing time, the stirring time in the subsequent individual experiments is increased by 20, 60, 120 and 180 seconds. Again, the amounts of filtrate obtained after the stated time intervals are determined.

EXAMPLE 1

A mixed sludge from a mechanical/biological treatment plant, which consisted of 80 parts of biological sludge and 20 parts of primary sludge and had been thickened to a sludge solids content of 5.0%, the organic proportion in the solids being 63%, was examined.

In preliminary experiments, the most effective flocculant and the optimum amount to use were determined in the laboratory. The requisite flocculation maturing time was determined by the method described above and was 120 seconds.

An 0.1% strength aqueous solution of the flocculant ®Sedipur CF 400 was introduced, in an amount of 300 g/m³ of sludge, into the sludge line. The flocculated sludge was then left for 2 minutes in a static cylindrical vessel, whilst being stirred. The spiral stirrer used rotated at 10 rpm. After this treatment, the sludge was subjected to preliminary dewatering, to a solids content of 11%, in a horizontal screening drum rotating at 3 rpm. This sludge was then subjected to pressure filtration in a chamber filter press, with plates spaced at 20 mm, by means of a reciprocating diaphragm pump, the final pressure being 15 bar. The filtration time was 90 minutes. The filter cakes obtained were dry and detached themselves unassisted from the filter cloths. The sludge solids content of the filter cake was 36.1% and the calorific value 890 kcal/kg. The filter cakes were combustible without added fuel.

COMPARATIVE EXAMPLE 1

Sewage sludge ash, $FeSO_4$ in the form of a 20% strength aqueous solution, and $Ca(OH)_2$ in the form of a 20% strength aqueous suspension (milk of lime) were added, in the stated sequence, to the thickened mixed sludge from Example 1, in a mixing vessel. The amounts of the additives, expressed as solids, were 40%, 20% and 40%, based on sludge solids. The mixture was then dewatered in a single stage, in a chamber filter press under 15 bar pressure. The filtration time was 120 minutes. The resulting solids content in the filter cake was 42%, but only 21% of this was sludge solids. Hence, the calorific value was only 375 kcal/kg.

COMPARATIVE EXAMPLE 2

The procedure followed was as in Example 1, but without pretreatment of the flocculated sludge, allowing a certain flocculation maturing time. Furthermore, the preliminary dewatering was dispensed with. The sludge, flocculated in the sludge feedline, was dewatered directly on the chamber filter press.

It was not possible to obtain a dry filter cake. The partially dewatered sludge adhered to the filter cloths. The sludge solids content was about 17%.

EXAMPLE 2

A primary sludge, obtained by sedimentation in the preclarification stage of a treatment plant of a chemical company, was thickened to 8% solids content by gravity sedimentation for 24 hours. The organic proportion of the sludge solids was 50.8%.

The most effective dewatering assistant was found to be a 50 percent anionically modified flocculant (®Seidpur AF 400). The requisite flocculation maturing time was found to be 180 seconds.

An 0.1 percent strength aqueous solution of the flocculant ®Sedipur AF 400 was added, in an amount of 160 g/m³ of sludge, to the thickened primary sludge in the sludge line. The flocculated sludge was then left for 3 minutes in a mixing tank whilst being stirred at 40 rpm, after which it was concentrated to a solids content of 18% in a horizontal screening drum rotating at 5 rpm.

The further dewatering, on the chamber filter press, was carried out as described in Example 1. The filtration time was 80 minutes. The filter cakes obtained were dry and detached themselves unaided from the filter cloths. The sludge solids content in the filter cake was 51.0% and the calorific value was 1,345 kcal/kg. The filter cakes were combustible without added fuel.

EXAMPLE 3

An activated sludge from a biological treatment plant, which had been thickened to 4.5% sludge solids, and in which the organic proportion of the solids was 79%, was homogeneously mixed with a coal sludge in a stirred tank. The weight ratio of sludge solids to coal particles was 3:1.

An 0.1 percent strength aqueous solution of a 50 percent cationically modified flocculant (®Sedipur CF 900) was added to the sludge mixture in the sludge line, in an amount of 6 kg of active ingredient/ton of sludge solids, not counting the coal constituent. The flocculated sludge mixture was treated for 120 seconds in a maturing tank stirred at a moderate speed (20 rpm) and was then subjected to preliminary dewatering in a screening drum (rotating at 10 rpm) until the total solids content was 12.5%.

The 2nd dewatering step was carried out on a chamber filter press as described in Example 1. The filtration time was 100 minutes. The filter cakes detached themselves satisfactorily from the filter cloths. The solids content of the press cakes was 35.8%, of which 26.8% were sludge solids and 9.0% were coal. The calorific value of the press cakes was 1,164 kcal/kg.

COMPARATIVE EXAMPLE 3

The mixed sludge from Example 1 was homogeneously mixed, in one case, with sewage sludge ash I produced by burning the flocculated mixed sludge, and, in another case, with sewage sludge ash II, produced by burning the mixed sludge which had been dewatered with inorganic dewatering assistants (cf. Comparative Example 1). Accordingly, sewage sludge ash I was free from lime whilst sewage sludge ash II contained lime. The amounts of sewage sludge ash used were 29 parts per 100 parts of sludge solids.

Each of the mixtures thus produced was flocculated with 300 mg/liter of sludge of a 1:1 flocculant mixture of ®Sedipur AF 400 and ®Sedipur CF 900, by stirring in a tank, with the stirrer running at 50 rpm. A flocculation maturing time of 2 minutes was employed.

Thereafter, in a 1st stage, a gravity filtration was carried out. The sludges subjected to this preliminary dewatering were then dewatered further in a 2nd stage, in a laboratory ram press for 1 minute under increasing pressure and for 2 minutes under a constant pressure of 10 bar.

The following dewatering results were obtained:

| Solids content (%) | Sample containing sewage sludge ash | |
|---|---|---|
| | I (lime-free) | II (containing lime) |
| after gravity filtration | 11.4 | 9.0 |
| after pressure filtration | 39.8 | 34.8 |

The results show that where sewage sludge ash was used as an additional dewatering assistant in dewatering sewage sludges pretreated with organic flocculants, lime-free sewage sludge ash gave better results than lime-containing ash.

We claim:

1. A process for dewatering sewage sludges with a chamber filter press without adding lime, ash or sand wherein the flocculated flake structure of the sludge remains stable in the filter press, which comprises:
   a. adding an organic flocculant to the sewage sludge in the amount of from 100 to 400 g/m$^3$ of sewage sludge;
   b. mixing the organic flocculant with the sewage sludge;
   c. holding the flocculant and sludge mixture for from 0.5 to 5 minutes for the formation of flocculated sewage sludge particles;
   d. passing the flocculated sewage sludge to a gravity filtration stage without pumping, thereby preventing the break-up of flocculated sewage sludge particles;
   e. gravity filtering the flocculated sewage sludge using a gravity filtration means to a sludge solids content of from 10 to 20% by weight;
   f. passing the gravity filtered flocculated sewage sludge particles to a chamber filter press without using shear forces by conveying using reciprocating diaphragm pumps or eccentric screw pumps, thereby preventing the break-up of the flocculated sewage sludge particles; and then
   g. pressure filtering the gravity filtered flocculated sewage sludge at a pressure of about 10 to 15 bar using a chamber filter press to a sludge layer thickness of from 15 to 30 mm, the sludge layer thickness being selected to suit the particular sludge to achieve a particularly high dewatered sludge solids content.

2. A process as claimed in claim 1, wherein a continuously running screening drum, provided with baffles, weirs or hollow spirals which renew the surface of the sludge by scraping, is used for dewatering in the gravity filtration stage.

3. A process as claimed in claim 1, wherein the sewage sludge is mixed homogeneously with coal sludge, sewage sludge ash, or a combination thereof before being flocculated and subjected to the two-stage dewatering treatment.

4. The process as recited in claim 1 wherein the flocculant and sludge mixture is held in step c. for from 0.5 to 3 minutes before being passed without shear to the gravity filtration stage.

5. The process as recited in claim 1 wherein the flocculant and sludge mixture is held in step c. for from 1 to 2 minutes before being passed without shear to the gravity filtration stage.

6. The process as recited in claim 4 or claim 5 wherein the flocculant and sludge mixture is stirred at from 5 to 50 rpm while it is held in step c.

* * * * *